United States Patent
Cho et al.

(10) Patent No.: US 9,786,890 B2
(45) Date of Patent: Oct. 10, 2017

(54) SEPARATOR AND ELECTROCHEMICAL DEVICE HAVING THE SAME

(71) Applicants: LG Chem, Ltd., Seoul (KR); TORAY INDUSTRIES, INC., Chuo-Ku (JP)

(72) Inventors: Byeong-Gyu Cho, Daejeon (KR); Jeong-Min Ha, Daejeon (KR); Su-Jin Yoon, Daejeon (KR); Jong-Hun Kim, Daejeon (KR); Byoung-Jin Shin, Daejeon (KR)

(73) Assignees: LG Chem, Ltd. (KR); TORAY INDUSTRIES, INC. (JP)

( * ) Notice: Subject to any disclaimer, the term of this patent is extended or adjusted under 35 U.S.C. 154(b) by 481 days.

(21) Appl. No.: 13/903,195

(22) Filed: May 28, 2013

(65) Prior Publication Data

US 2013/0260208 A1 Oct. 3, 2013

Related U.S. Application Data

(63) Continuation of application No. PCT/KR2012/009075, filed on Oct. 31, 2012.

(30) Foreign Application Priority Data

Nov. 1, 2011 (KR) .................. 10-2011-0112980
Oct. 31, 2012 (KR) .................. 10-2012-0122137

(51) Int. Cl.
*H01M 2/16* (2006.01)
*H01M 2/18* (2006.01)
*H01M 10/052* (2010.01)

(52) U.S. Cl.
CPC ......... *H01M 2/1686* (2013.01); *H01M 2/166* (2013.01); *H01M 2/1653* (2013.01);
(Continued)

(58) Field of Classification Search
CPC ...... H01M 2/166; H01M 2/1686; H01M 2/18; H01M 2/1653; H01M 10/052
See application file for complete search history.

(56) References Cited

U.S. PATENT DOCUMENTS

2004/0053122 A1* 3/2004 Sugiyama ........... H01M 10/052
429/144
2009/0111026 A1 4/2009 Kim et al.
(Continued)

FOREIGN PATENT DOCUMENTS

JP 2009-026733 A 2/2009
JP 2009-283273 A 12/2009
(Continued)

OTHER PUBLICATIONS

Zhang et al. "A Review and Recent Developments in Membrane Separators for Rechargeable Lithium-ion Batteries" Energy Environ. Sci. 7 (12) Aug. 2014.*
(Continued)

*Primary Examiner* — Lisa S Park
(74) *Attorney, Agent, or Firm* — Lerner, David, Littenberg, Krumholz & Mentlik, LLP

(57) ABSTRACT

The present invention provides a separator having a porous substrate; and a porous coating layer formed on one surface of the porous substrate and comprising a mixture of inorganic particles and a binder polymer, which has a value of a porosity×an air permeability per thickness in the range of 5 to 40, the porosity and the air permeability per thickness. The separator having a porous coating layer according to the present invention has a porosity which is controlled depending on the air permeability of the porous substrate, and thus exhibit superior ionic conductivity as well as good mechanical properties, thereby contributing to improve the performance and safety of an electrochemical device.

8 Claims, 1 Drawing Sheet

(52) U.S. Cl.
CPC ............ *H01M 2/18* (2013.01); *H01M 10/052* (2013.01); *Y02E 60/122* (2013.01); *Y10T 29/49108* (2015.01)

(56) References Cited

U.S. PATENT DOCUMENTS

2009/0136848 A1* 5/2009 Minami .............. H01M 10/052
                                                    429/224
2010/0233547 A1* 9/2010 Baba .................... H01M 2/166
                                                    429/246
2012/0034509 A1   2/2012 Bae et al.

FOREIGN PATENT DOCUMENTS

| | | |
|---|---|---|
| JP | 2010-517811 A | 5/2010 |
| KR | 2006-0111842 A | 10/2006 |
| KR | 20100028009 A | 3/2010 |
| KR | 20100108997 A | 10/2010 |
| KR | 20110075631 A | 7/2011 |

OTHER PUBLICATIONS

Office Action from European Application No. 12844795.0, dated Aug. 26, 2016.
ISO 5636-5 Paper and board—Determination of air permeance and air resistance (medium range)—Part 5: Gurley method, International Standard ISO/IEC, ISO, IEC International Standard 13818-1:20000(E), Geneva, vol. ISO 5636, No. Part 5, Jun. 1, 2003, pp. 1-8, XP009108822.

* cited by examiner

SEPARATOR AND ELECTROCHEMICAL DEVICE HAVING THE SAME

CROSS-REFERENCE TO RELATED APPLICATION

This application is a continuation of International Application No. PCT/KR2012/009075 filed on Oct. 31, 2012, which claims priority under 35 USC 119(a) to Korean Patent Application No. 10-2011-0112980 filed in the Republic of Korea on Nov. 1, 2011 and Korean Patent Application No. 10-2012-0122137 filed in the Republic of Korea on Oct. 31, 2012, the disclosures of which are incorporated herein by reference.

TECHNICAL FIELD

The present invention relates to a separator for an electrochemical device such as a lithium secondary battery, and an electrochemical device having the same. More particularly, the present invention relates to a separator having a porous coating layer comprising an organic-inorganic mixture, and an electrochemical device having the same.

BACKGROUND ART

Recently, there has been an increasing interest in energy storage technology. Electrochemical devices have been widely used as energy sources in the fields of cellular phones, camcorders, notebook computers, PCs and electric cars, resulting in intensive research and development into them.

In this regard, electrochemical devices are one of the subjects of great interest. Particularly, development of rechargeable secondary batteries has been the focus of attention. Recently, research and development of such batteries are focused on the designs of new electrodes and batteries to improve capacity density and specific energy.

Many secondary batteries are currently available. Among these, lithium secondary batteries developed in the early 1990's have drawn particular attention due to their advantages of higher operating voltages and much higher energy densities than conventional aqueous electrolyte-based batteries, for example, Ni-MH, Ni—Cd, and $H_2SO_4$—Pb batteries. However, such lithium ion batteries suffer from safety problems, such as fire and explosion, when encountered with the use of organic electrolytes and are disadvantageously complicated to fabricate. In attempts to overcome the disadvantages of lithium ion batteries, lithium ion polymer batteries have been developed as next-generation batteries. More research is still urgently needed to improve the relatively low capacities and insufficient low-temperature discharge capacities of lithium ion polymer batteries in comparison with lithium ion batteries.

Many companies have produced a variety of electrochemical devices with different safety characteristics. It is very important to evaluate and ensure the safety of such electrochemical devices. The most important consideration for safety is that operational failure or malfunction of electrochemical devices should not cause injury to users. For this purpose, regulatory guidelines strictly restrict potential dangers (such as fire and smoke emission) of electrochemical devices. Overheating of an electrochemical device may cause thermal runaway or a puncture of a separator may pose an increased risk of explosion. In particular, porous polyolefin substrates commonly used as separators for electrochemical devices undergo severe thermal shrinkage at a temperature of 100° C. or higher in view of their material characteristics and production processes including elongation. This thermal shrinkage behavior may cause a short circuit between a cathode and an anode.

In order to solve the above safety problems of electrochemical devices, a separator comprising a highly porous substrate and a porous organic/inorganic coating layer formed by coating a mixture of an excess of inorganic particles and a binder polymer on at least one surface of the porous substrate has been proposed. If the porous organic/inorganic coating layer is formed on the outer surface of the porous substrate for the purpose of safety, it is necessary to control the content ratio of the inorganic particles and the binder polymer or the thickness of the porous coating layer, depending on the properties of the porous substrate. However, there has been no specific basis for such a control.

DISCLOSURE

Technical Problem

The present invention is designed to solve the problems of the prior art, and therefore it is an object of the present invention to provide a separator having a porous organic-inorganic coating layer satisfying an optimal condition for strengthening the safety of an electrochemical device.

Technical Solution

In accordance with one aspect of the present invention, there is provided a separator, comprising a porous substrate; and a porous coating layer formed on at least one surface of the porous substrate and comprising a mixture of inorganic particles and a binder polymer, which has a value of a porosity×an air permeability per thickness in the range of 5 to 40, the porosity and the air permeability per thickness being defined by Formula (I) and Formula (II), respectively:

Porosity=1−(the weight ratio of the inorganic particles/the density of the inorganic particles+the weight ratio of the binder polymer/the density of the binder polymer)     [Formula (I)]

Air Permeability per thickness=(the air permeability of the separator−the air permeability of the porous substrate)/(the thickness of the separator−the thickness of the porous substrate)     [Formula (II)]

Preferably, in the present invention, the porosity ranges from equal to or greater than 0.5 to less than 1, and the air permeability per thickness ranges from 5 to 80.

The porous substrate may be made of a polyolefin-based polymer, but is not particularly limited thereto. The polyolefin-based polymer is preferably selected from polyethylene, polypropylene, polybutylene and polypentene.

The inorganic particles used in the present invention may be inorganic particles having a dielectric constant of 5 or higher, inorganic particles having the ability to transport lithium ions, or a mixture thereof.

Examples of the inorganic particles having a dielectric constant of 5 or higher include $BaTiO_3$, $Pb(Zr_x,Ti_{1-x})O_3$ (PZT, 0<x<1), $Pb_{1-x}La_xZr_{1-y}Ti_yO_3$ (PLZT, 0<x<1, 0<y<1), $(1-x)Pb(Mg_{1/3}Nb_{2/3})O_{3-x}PbTiO_3$ (PMN-PT, 0<x<1), hafnia ($HfO_2$), $SrTiO_3$, $SnO_2$, $CeO_2$, $MgO$, $NiO$, $CaO$, $ZnO$, $ZrO_2$, $SiO_2$, $Y_2O_3$, $Al_2O_3$, $SiC$, $TiO_2$ inorganic particles and a mixture thereof, but are not particularly limited thereto.

Also, examples of the inorganic particles having the ability to transport lithium ions include lithium phosphate ($Li_3PO_4$), lithium titanium phosphate ($Li_xTi_y(PO_4)_3$, $0<x<2$, $0<y<3$), lithium aluminum titanium phosphate ($Li_xAl_yTi_z(PO_4)_3$, $0<x<2$, $0<y<1$, $0<z<3$), $(LiAlTiP)_xO_y$ type glass ($0<x<4$, $0<y<13$), lithium lanthanum titanate ($Li_xLa_yTiO_3$, $0<x<2$, $0<y<3$), lithium germanium thiophosphate ($Li_xGe_yP_zS_w$, $0<x<4$, $0<y<1$, $0<z<1$, $0<w<5$), lithium nitride ($Li_xN_y$, $0<x<4$, $0<y<2$), $SiS_2$ type glass ($Li_xSi_yS_z$, $0<x<3$, $0<y<2$, $0<z<4$), $P_2S_5$ type glass ($Li_xP_yS_z$, $0<x<3$, $0<y<3$, $0<z<7$) inorganic particles, and a mixture thereof, but are not limited thereto.

In addition, the binder polymer may be selected from the group consisting of polyvinylidene fluoride-co-hexafluoropropylene, polyvinylidene fluoride-co-trichloroethylene, polymethyl methacrylate, polybutyl acrylate, polyacrylonitrile, polyvinylpyrrolidone, polyvinyl acetate, polyvinyl alcohol, polyethylene-co-vinyl acetate, polyethylene oxide, polyarylate, cellulose acetate, cellulose acetate butyrate, cellulose acetate propionate, cyanoethylpullulan, cyanoethyl polyvinyl alcohol, cyanoethyl cellulose, cyanoethyl sucrose, pullulan, carboxymethyl cellulose, a low molecular compound having a molecular weight of 10,000 g/mol or less, and a mixture thereof, but are not limited thereto.

The separator of the present invention may be used in an electrochemical device such as a lithium secondary battery and a super capacitor device.

Advantageous Effects

The separator having a porous coating layer according to the present invention has a porosity of the porous coating layer, which is controlled depending on the air permeability of the porous substrate, and thus exhibit superior ionic conductivity as well as good mechanical properties, thereby contributing to improve the performance and safety of an electrochemical device.

BEST MODE

Figure 1:
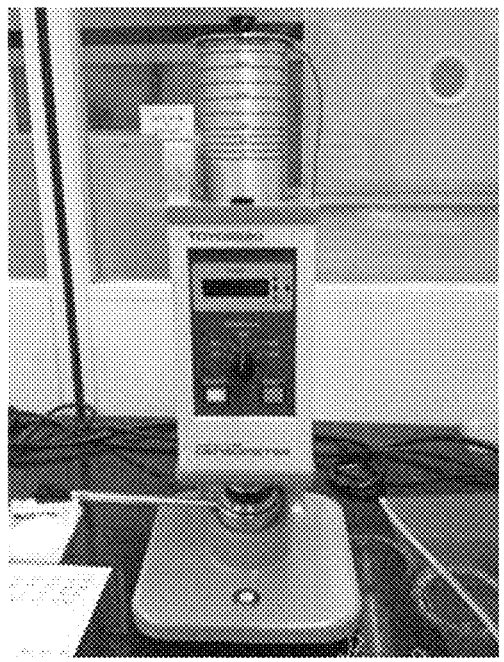
FIG. 1 is a photograph of an equipment used for measuring an air permeability in the Examples and Comparative Examples illustrated herein.

Hereinafter, the present invention will be described in detail. Prior to the description, it should be understood that the terms used in the specification and the appended claims should not be construed as limited to general and dictionary meanings, but interpreted based on the meanings and concepts corresponding to technical aspects of the present invention on the basis of the principle that the inventor is allowed to define terms appropriately for the best explanation. Also, the embodiments proposed herein are just a preferable example for the purpose of illustrations only, not intended to limit the scope of the disclosure, so it should be understood that other equivalents and modifications could be made thereto without departing from the spirit and scope of the disclosure.

The present invention provides a separator, comprising a porous substrate; and a porous coating layer formed on at least one surface of the porous substrate and comprising a mixture of inorganic particles and a binder polymer, which has a value of a porosity×an air permeability per thickness in the range of 5 to 40, the porosity and the air permeability per thickness being defined by Formula (I) and Formula (II), respectively:

Porosity=1−(the weight ratio of the inorganic particles/the density of the inorganic particles+the weight ratio of the binder polymer/the density of the binder polymer)    [Formula (I)]

Air Permeability per thickness=(the air permeability of the separator−the air permeability of the porous substrate)/(the thickness of the separator−the thickness of the porous substrate)    [Formula (II)]

The terms 'the weight ratio of the inorganic particles' and 'the weight ratio of the binder polymer', which are used herein, refer to the weight of each of the inorganic particles and the binder polymer based on 100 parts by weight of the total weight of the inorganic particles and the binder polymer.

Also, it is understood that the terms 'a porosity' and 'an air permeability per thickness', which are used herein, refer to the porosity and air permeability of the porous coating layer, unless other indication is given.

In the porous coating layer, the binder polymer allows the adhesion of the inorganic particles so that the inorganic particles can be bound with each other (i.e., the binder polymer connects and immobilizes the inorganic particles therebetween), and also, the inorganic particles are substantially present in contact with each other to form a closest packed structure, and an interstitial volume generated from the contact of the inorganic particles with each other becomes a pore of the porous coating layer. The separator comprising such a porous coating layer can maintain air permeability with improved thermal safety, due to the nature of the porous coating layer.

However, the binder polymer functions to hinder ions from transferring to increase the resistance of the ions. Accordingly, the use of the binder polymer in an excessive amount may deteriorate the performance of an electrochemical device, while the use of the binder polymer in a small amount may cause the release of the inorganic particles to deteriorate mechanical properties. Therefore, it is important to control the amount of the binder.

Also, as the porous coating layer is present, the air permeability of the porous substrate is actually reduced. Accordingly, it is necessary to define the air permeability range of the porous coating layer in a certain degree so that the performance of an electrochemical device is not excessively deteriorated. That is, it is preferred to control the properties of the porous coating layer taking into account the air permeability of the porous substrate to be used.

Since in the separator of the present invention, a value of a porosity×an air permeability per thickness is in the range of 5 to 40, the porosity thereof can be controlled depending on the air permeability of the porous substrate, to allow the coating layer to have good mechanical properties and ionic conductivity, and eventually contribute to improve the performance and safety of an electrochemical device.

More preferably, in the separator of the present invention, a porosity ranges from equal to or greater than 0.5 to less than 1, and an air permeability per thickness ranges from 5 to 80, while satisfying a value of a porosity×an air permeability per thickness in the range of 5 to 40.

The term "porosity" which is used herein refers to the ratio of pore spaces occupied in a porous substance, i.e., a fraction of the volume of empty pores over the total volume in the substance. In the present invention, the porosity is represented by a value obtained by dividing the weight ratio of the inorganic particles and the binder polymer by each density.

In the present invention, the term "air permeability per thickness" refers to a value obtained by dividing the difference between the air permeability of the separator and the air permeability of the porous substrate by the thickness of the porous layer (the thickness of the separator−the thickness of the porous substrate). The unit for the porosity is 'sec/100 ml', and the unit for the thickness of the porous coating layer is 'μm'.

If the value of 'a porosity×an air permeability per thickness' is less than 5, a space between the inorganic particles becomes overly broad, from which an inner short circuit on the infiltration of a foreign substance may occur to deteriorate safety. If the value of 'a porosity×an air permeability per thickness' is greater than 40, passages capable of transporting lithium ions may be reduced to severely deteriorate ionic conductivity, and thus, the separator fails to be used in an electrochemical device.

In the present invention, the porous substrate may be made of a polyolefin-based polymer. The polyolefin-based polymer is preferably selected from polyethylene, polypropylene, polybutylene and polypentene.

The inorganic particles used in the present invention may be inorganic particles having a dielectric constant of 5 or higher, inorganic particles having the ability to transport lithium ions, or a mixture thereof.

Non-limiting examples of the inorganic particles having a dielectric constant of 5 or higher include $BaTiO_3$, $Pb(Zr_x,Ti_{1-x})O_3$ (PZT, $0<x<1$), $Pb_{1-x}La_xZr_{1-y}Ti_yO_3$ (PLZT, $0<x<1$, $0<y<1$), $(1-x)Pb(Mg_{1/3}Nb_{2/3})O_3-xPbTiO_3$ (PMN-PT, $0<x<1$), hafnia ($HfO_2$), $SrTiO_3$, $SnO_2$, $CeO_2$, MgO, NiO, CaO, ZnO, $ZrO_2$, $SiO_2$, $Y_2O_3$, $Al_2O_3$, $TiO_2$, SiC, inorganic particles and a mixture thereof. Also, non-limiting examples of the inorganic particles having the ability to transport lithium ions include lithium phosphate ($Li_3PO_4$), lithium titanium phosphate ($Li_xTi_y(PO_4)_3$, $0<x<2$, $0<y<3$), lithium aluminum titanium phosphate ($Li_xAl_yTi_z(PO_4)_3$, $0<x<2$, $0<y<1$, $0<z<3$), $(LiAlTiP)_xO_y$ type glass ($0<x<4$, $0<y<13$), lithium lanthanum titanate ($Li_xLa_yTiO_3$, $0<x<2$, $0<y<3$), lithium germanium thiophosphate ($Li_xGe_yP_zS_w$, $0<x<4$, $0<y<1$, $0<z<1$, $0<w<5$), lithium nitride ($Li_xN_y$, $0<x<4$, $0<y<2$), $SiS_2$ type glass ($Li_xSi_yS_z$, $0<x<3$, $0<y<2$, $0<z<4$), $P_2S_5$ type glass ($Li_xP_yS_z$, $0<x<3$, $0<y<3$, $0<z<7$), and a mixture thereof.

The binder polymer may be any one selected from the group consisting of polyvinylidene fluoride-co-hexafluoropropylene, polyvinylidene fluoride-co-trichloroethylene, polymethyl methacrylate, polybutyl acrylate, polyacrylonitrile, polyvinylpyrrolidone, polyvinyl acetate, polyvinyl alcohol, polyethylene-co-vinyl acetate, polyethylene oxide, polyarylate, cellulose acetate, cellulose acetate butyrate, cellulose acetate propionate, cyanoethylpullulan, cyanoethyl polyvinyl alcohol, cyanoethyl cellulose, cyanoethyl sucrose, pullulan, carboxymethyl cellulose, a low molecular compound having a molecular weight of 10,000 g/mol or less, and a mixture thereof.

Further, the present invention provides an electrochemical device comprising a cathode, an anode, the above-mentioned separator which is interposed between the cathode and the anode, and an electrolyte solution.

In the present invention, the cathode and the anode are not particularly limited, and may be manufactured by binding an electrode active material to an electrode current collector according to a conventional method known in the art.

As a cathode active material, those that are commonly used in cathodes of conventional electrochemical devices may be used. Non-limiting examples of the cathode active material may be any one selected from the group consisting of $LiCoO_2$, $LiNiO_2$, $LiMn_2O_4$, $LiCoPO_4$, $LiFePO_4$, $LiNiMnCoO_2$, $LiNi_{1-x-y-z}Co_xM1_yM2_zO_2$ (wherein M1 and M2 are each independently selected from the group consisting of Al, Ni, Co, Fe, Mn, V, Cr, Ti, W, Ta, Mg and Mo, and x, y and z are each independently an atomic fraction of oxide-forming elements, in which $0 \le x < 0.5$, $0 \le y < 0.5$, $0 \le z < 0.5$, and $x+y+z<1$).

Also, as an anode active material, those that are commonly used in anodes of conventional electrochemical devices may be used, and non-limiting examples thereof include lithium, lithium alloys, and lithium intercalation materials such as carbon, petroleum coke, activated carbon, graphite and other carbonaceous materials. Non-limiting examples of a usable cathode current collector include aluminum foils, nickel foils and a combination thereof. Non-limiting examples of a usable anode current collector include copper foils, gold foils, nickel foils, copper alloy foils and a combination thereof.

The electrolyte solution which may be used in the present invention is obtained by dissolving or dissociating a salt in an organic solvent. The salt has a structure represented by $A^+B^-$ wherein $A^+$ is an alkali metal cation such as $Li^+$, $Na^+$, $K^+$ and a combination thereof and $B^-$ is an anion such as $PF_6^-$, $BF_4^-$, $Cl^-$, $Br^-$, $I^-$, $ClO_4^-$, $AsF_6^-$, $CH_3CO_2^-$, $CF_3SO_3^-$, $N(CF_3SO_2)_2^-$, $C(CF_2SO_2)_3^-$ and a combination thereof. Examples of the organic solvent include propylene carbonate (PC), ethylene carbonate (EC), diethyl carbonate (DEC), dimethyl carbonate (DMC), dipropyl carbonate (DPC), dimethyl sulfoxide, acetonitrile, dimethoxyethane, diethoxyethane, tetrahydrofuran, N-methyl-2-pyrrolidone (NMP), ethyl methyl carbonate (EMC), γ-butyrolactone and a mixture thereof, but are not limited thereto. The electrolyte solution may be introduced in any suitable step during the manufacturing of the electrochemical device depending on the manufacturing processes and desired physical properties of a final product. Specifically, the electrolyte may be introduced before assembling a battery or in the final step of the assembling.

Hereinafter, various preferred examples of the present invention will be described in detail for better understanding. However, the examples of the present invention may be modified in various ways, and they should not be interpreted as limiting the scope of the invention. The examples of the present invention are just for better understanding of the invention to persons having ordinary skill in the art.

EXAMPLE

Example 1

Manufacture of Separator Having Porous Coating Layer Comprising Alumina/PVdF-HFP/Cyanoethyl Polyvinyl Alcohol Mixture 5 parts by weight of PVdF-HFP copolymer and 5 parts by weight of cyanoethyl polyvinyl alcohol were dissolved in acetone. To the resultant binder solution, 90 parts by weight of alumina (Density: 4.0 g/cm³) was added, and dispersed by way of a ball mill method, to obtain a slurry.

The slurry obtained above was coated on one surface of a 9 μm-thick polyolefin film (Asahi Kasei, ND509) and dried, to form a porous coating layer having an average thickness of 5 μm.

Example 2

Manufacture of Separator Having Porous Coating Layer Comprising Alumina/Cyanoethyl Polyvinyl Alcohol Mixture 5 parts by weight of cyanoethyl polyvinyl alcohol was dissolved in acetone. To the resultant binder solution, 95 parts by weight of alumina was added, and dispersed by way of a ball mill method, to obtain a slurry.

The slurry obtained above was coated on one surface of a 9 μm-thick polyolefin film (Asahi Kasei, ND509) and dried, to form a porous coating layer having an average thickness of 5 μm.

Example 3

Manufacture of Separator Having Porous Coating Layer Comprising $BaTiO_3$/PVdF-HFP/Cyanoethyl Polyvinyl Alcohol Mixture 5 parts by weight of PVdF-HFP copolymer and 5 parts by weight of cyanoethyl polyvinyl alcohol were dissolved in acetone. To the resultant binder solution, 90 parts by weight of $BaTiO_3$ (Density: 5.7 $g/cm^3$) was added, and dispersed by way of a ball mill method, to obtain a slurry.

The slurry obtained above was coated on one surface of a 9 μm-thick polyolefin film (Asahi Kasei, ND509) and dried, to form a porous coating layer having an average thickness of 5 μm.

Example 4

Manufacture of Separator Having Porous Coating Layer Comprising Alumina/PVdF-HFP/Cyanoethyl Polyvinyl Alcohol Mixture 10 parts by weight of PVdF-HFP copolymer and 5 parts by weight of cyanoethyl polyvinyl alcohol were dissolved in acetone. To the resultant binder solution, 85 parts by weight of alumina was added, and dispersed by way of a ball mill method, to obtain a slurry.

The slurry obtained above was coated on one surface of a 9 μm-thick polyolefin film (Asahi Kasei, ND509) and dried, to form a porous coating layer having an average thickness of 5 μm.

Example 5

Manufacture of Separator Having Porous Coating Layer Comprising Alumina/PVdF-HFP/Cyanoethyl Polyvinyl Alcohol Mixture 2 parts by weight of PVdF-HFP copolymer and 3 parts by weight of cyanoethyl polyvinyl alcohol were dissolved in acetone. To the resultant binder solution, 95 parts by weight of alumina was added, and dispersed by way of a ball mill method, to obtain a slurry.

The slurry obtained above was coated on one surface of a 9 μm-thick polyolefin film (Asahi Kasei, ND509) and dried, to form a porous coating layer having an average thickness of 5 μm.

Comparative Example 1

Manufacture of Separator Having Porous Coating Layer Comprising Alumina/PVdF-HFP/Cyanoethyl Polyvinyl Alcohol Mixture 10 parts by weight of PVdF-HFP copolymer and 10 parts by weight of cyanoethyl polyvinyl alcohol were dissolved in acetone. To the resultant binder solution, 80 parts by weight of alumina was added, and dispersed by way of a ball mill method, to obtain a slurry.

The slurry obtained above was coated on one surface of a 9 μm-thick polyolefin film (Asahi Kasei, ND509) and dried, to form a porous coating layer having an average thickness of 5 μm.

Comparative Example 2

Manufacture of Separator Having Porous Coating Layer Comprising Alumina/PVdF-HFP Mixture 20 parts by weight of PVdF-HFP copolymer was dissolved in acetone. To the resultant binder solution, 80 parts by weight of alumina was added, and dispersed by way of a ball mill method, to obtain a slurry.

The slurry obtained above was coated on one surface of a 9 μm-thick polyolefin film (Asahi Kasei, ND509) and dried, to form a porous coating layer having an average thickness of 5 μm.

Comparative Example 3

Manufacture of Separator Having Porous Coating Layer Comprising Alumina/PVdF-HFP/Cyanoethyl Polyvinyl Alcohol Mixture 25 parts by weight of PVdF-HFP copolymer and 25 parts by weight of cyanoethyl polyvinyl alcohol were dissolved in acetone. To the resultant binder solution, 50 parts by weight of alumina was added, and dispersed by way of a ball mill method, to obtain a slurry.

The slurry obtained above was coated on one surface of a 9 μm-thick polyolefin film (Asahi Kasei, ND509) and dried, to form a porous coating layer having an average thickness of 5 μm.

Test Example

Figure 2:
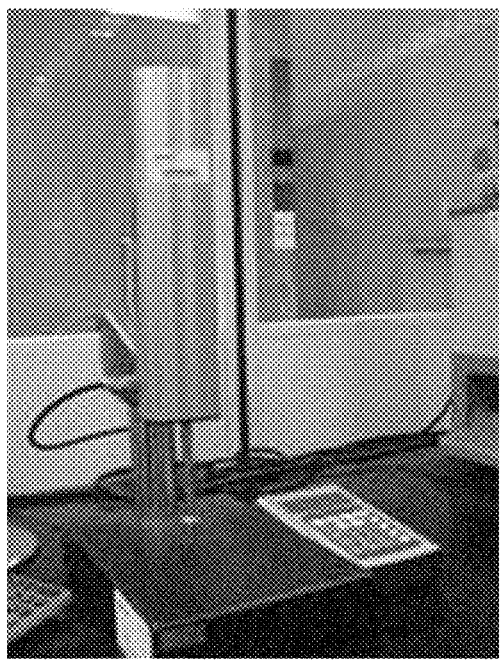
FIG. 2 is a photograph of an equipment used for measuring a thickness in the Examples and Comparative Examples illustrated herein.

The separators prepared in Examples 1 to 5 and Comparative Examples 1 to 3 were measured for their properties, and the results thereof are shown in Table 1. Among the properties of the separators, the air permeability thereof was obtained by measuring the time it takes for 100 ml of air to pass through each separator using Gurley Type Densometer (Toyoseki) as shown in FIG. 1, and the thickness thereof was obtained by cutting each porous substrate and each separator into a piece having a size of 5 cm×5 cm and measuring 5 times the thickness of four corners and the dead center for each piece using a thickness gauge (Tesa, Swiss) as shown in FIG. 2, followed by calculating the average.

TABLE 1

|  | Ex. 1 | Ex. 2 | Ex. 3 | Ex. 4 | Ex. 5 | Com. Ex. 1 | Com. Ex. 2 | Com. Ex. 3 |
| --- | --- | --- | --- | --- | --- | --- | --- | --- |
| Porosity | 0.701 | 0.708 | 0.768 | 0.685 | 0.724 | 0.652 | 0.713 | 0.505 |
| Air Permeability of Porous Substrate | 150 | 150 | 150 | 150 | 150 | 150 | 150 | 150 |

TABLE 1-continued

|  | Ex. 1 | Ex. 2 | Ex. 3 | Ex. 4 | Ex. 5 | Com. Ex. 1 | Com. Ex. 2 | Com. Ex. 3 |
|---|---|---|---|---|---|---|---|---|
| Air Permeability of Separator | 350 | 280 | 330 | 410 | 220 | 500 | 180 | 800 |
| Thickness of Porous Substrate | 9 | 9 | 9 | 9 | 9 | 9 | 9 | 9 |
| Thickness of Separator | 14 | 14 | 14 | 14 | 14 | 14 | 14 | 14 |
| Air Permeability per thickness | 40 | 26 | 36 | 52 | 20 | 70 | 6 | 130 |
| Porosity × Air Permeability per thickness | 28.04 | 18.41 | 27.65 | 35.62 | 10.14 | 45.64 | 4.12 | 65.65 |
| Ionic Conductivity (×E−4 S/cm) | 5.6 | 4.6 | 5.2 | 3.7 | 6.4 | 1.4 | Unmeasurable | 0.2 |

As shown in Table 1, the separators of Examples 1 to 5 exhibited an ionic conductivity of 3.7 to 6.4 (×E4 S/cm), whereas those of Comparative Examples 1 and 3, 1.4 and 0.2 (×E4 S/cm), respectively. That is, the separators of Examples 1 to 5 were confirmed to have a superior ionic conductivity as compared with those of Comparative Examples 1 and 3. Also, it was confirmed that the separator of Comparative Example 2 cannot be used as a separator as the porous coating layer thereof was melted in an electrolyte solution.

What is claimed is:

1. A separator, comprising a porous substrate; and a porous coating layer formed on at least one surface of the porous substrate and comprising a mixture of inorganic particles and a binder polymer, wherein the separator has a value of a porosity×an air permeability per thickness in the range of 5 to 40, the porosity and the air permeability per thickness being defined by Formula (I) and Formula (II), respectively:

Porosity=1−(the weight ratio of the inorganic particles/the density of the inorganic particles+the weight ratio of the binder polymer/the density of the binder polymer)   [Formula (I)]

Air Permeability per thickness=(the air permeability of the separator−the air permeability of the porous substrate)/(the thickness of the separator−the thickness of the porous substrate)   [Formula (II)]

wherein the porosity ranges from equal to or greater than 0.5 to less than 1, and the air permeability per thickness ranges from 5 to 80, and the binder polymer is selected from the group consisting of polyvinylidene fluoride-co-hexafluoropropylene, polyvinylidene fluoride-co-trichloroethylene, polymethyl methacrylate, polybutyl acrylate, polyacrylonitrile, polyvinylpyrrolidone, polyvinyl acetate, polyvinyl alcohol, polyethylene-co-vinyl acetate, polyethylene oxide, polyarylate, cellulose acetate, cellulose acetate butyrate, cellulose acetate propionate, cyanoethylpullulan, cyanoethyl polyvinyl alcohol, cyanoethyl cellulose, cyanoethyl sucrose, pullulan, carboxymethyl cellulose, a low molecular compound having a molecular weight of 10,000 g/mol or less, and a mixture thereof wherein the porous coating layer is prepared from a slurry wherein the binder polymer is dissolved and the inorganic particles are included, and wherein the separator has an ionic conductivity of 3.7 to $6.4 \times 10^{-4}$ S/cm.

2. The separator according to claim 1, wherein the porous substrate is made of a polyolefin-based polymer.

3. The separator according to claim 2, wherein the porous substrate is made of a polyolefin-based polymer selected from the group consisting of polyethylene, polypropylene, polybutylene and polypentene.

4. The separator according to claim 1, wherein the inorganic particles are selected from the group consisting of inorganic particles having a dielectric constant of 5 or higher, inorganic particles having the ability to transport lithium ions, and a mixture thereof.

5. The separator according to claim 4, wherein the inorganic particles having a dielectric constant of 5 or higher are selected from the group consisting of $BaTiO_3$, $Pb(Zr_x,Ti_{1-x})O_3$ (PZT, $0<x<1$), $Pb_{1-x}La_xZr_{1-y}Ti_yO_3$ (PLZT, $0<x<1$, $0<y<1$), $(1-x)Pb(Mg_{1/3}Nb_{2/3})O_3$-$xPbTiO_3$ (PMN-PT, $0<x<1$), hafnia ($HfO_2$), $SrTiO_3$, $SnO_2$, $CeO_2$, MgO, NiO, CaO, ZnO, $ZrO_2$, $SiO_2$, $Y_2O_3$, $Al_2O_3$, SiC, $TiO_2$ inorganic particles and a mixture thereof.

6. The separator according to claim 4, wherein the inorganic particles having the ability to transport lithium ions are selected from the group consisting of lithium phosphate ($Li_3PO_4$), lithium titanium phosphate ($Li_xTi_y(PO_4)_3$, $0<x<2$, $0<y<3$), lithium aluminum titanium phosphate ($Li_xAl_yTi_z(PO_4)_3$, $0<x<2$, $0<y<1$, $0<z<3$), $(LiAlTiP)_xO_y$ type glass ($0<x<4$, $0<y<13$), lithium lanthanum titanate ($Li_xLa_yTiO_3$, $0<x<2$, $0<y<3$), lithium germanium thiophosphate ($Li_xGe_yP_zS_w$, $0<x<4$, $0<y<1$, $0<z<1$, $0<w<5$), lithium nitride ($Li_xN_y$, $0<x<4$, $0<y<2$), $SiS_2$ type glass ($Li_xSi_yS_z$, $0<x<3$, $0<y<2$, $0<z<4$), $P_2S_5$ type glass ($Li_xP_yS_z$, $0<x<3$, $0<y<3$, $0<z<7$) particles, and a mixture thereof.

7. An electrochemical device, comprising a cathode, an anode and a separator interposed between the cathode and the anode, wherein the separator is defined in claim 1.

8. The electrochemical device according to claim 7, which is a lithium secondary battery.

* * * * *